W. & A. Shedlock & G. Marshall,
Stop Cock,

No. 52,895. Patented Feb. 27, 1866.

Witnesses:
J. W. Coombs
Geo. W. Reed

Inventors:
W. Shedlock
A. Shedlock
G. Marshall
per Brown Coombs & Co
Attorneys

UNITED STATES PATENT OFFICE.

WM. SHEDLOCK, ALFRED SHEDLOCK, AND GEORGE MARSHALL, OF BROOKLYN, E. D., NEW YORK.

IMPROVEMENT IN STOP-VALVES.

Specification forming part of Letters Patent No. 52,895, dated February 27, 1866.

*To all whom it may concern:*

Be it known that we, WILLIAM SHEDLOCK, ALFRED SHEDLOCK, and GEORGE MARSHALL, all of the eastern district of the city of Brooklyn, in the county of Kings and State of New York, have invented a new and useful Improvement in Stop-Valves for Steam and Water Pipes, and for other purposes; and we hereby declare the following to be a full, clear, and exact description of the same, reference being had to the accompanying drawings, forming a part of this specification, in which—

Figure 1:
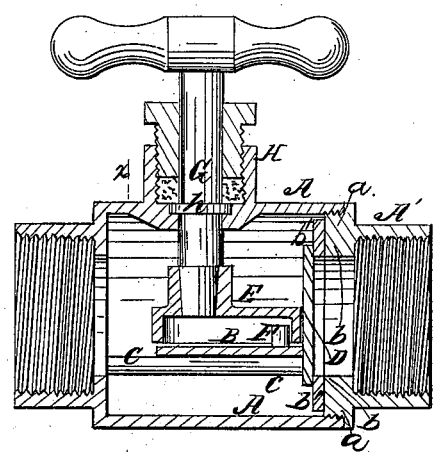
Figure 3:
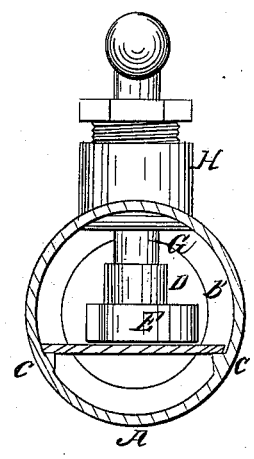
Figure 2:
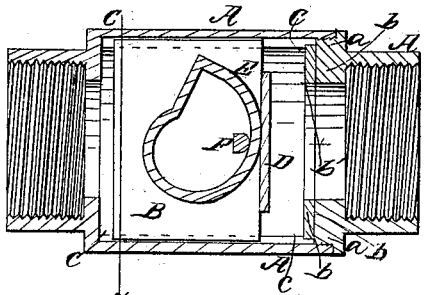

Figure 1 represents a central vertical longitudinal section of a stop-valve constructed according to our invention. Fig. 2 is a horizontal section of the same with the valve partly opened. Fig. 3 is a transverse vertical section of the same through line $x$, Figs. 1 and 2, looking toward the back of the valve.

Similar letters of reference indicate corresponding parts in the several figures.

This invention consists in a novel construction and arrangement of stop-valves for steam, water, or other pipes, wherein the valve attached to a carriage is made to slide to or from its seat, in a direction perpendicular thereto, upon bearings provided upon the inner surface of the surrounding shell or casing, by means of a cam of appropriate shape, which is worked by a rod extending through a stuffing-box.

To enable others skilled in the art to construct and apply our invention to use, we will proceed to describe it with reference to the drawings.

A A' is the hollow shell containing the valve and its necessary appurtenances, provided with female screw-threads upon the inner surface of each end, for the purpose of adapting it to a corresponding male thread, which may be upon the ends of the pipes to which the valve is to be applied. This shell is made in two parts, the end A' being screwed into the body of the shell at $a$, and finished upon its inner face for a valve-seat, $b$, either plane or concave.

Upon the inner surface of the shell A are two bearings, C C, running longitudinally and parallel with linear center of the same, and directly opposite each other. A carriage, B, attached to the valve D slides upon these bearings C C, and has upon its upper surface a short pin or stud, which rests against the inner face of a scroll-cam, E, used for the purpose of opening and closing the valve, the outer face of the cam bearing against the rear surface or back of the valve. This cam has a socket of a square or polygonal shape, into which a spindle, G, with corresponding end fits, said spindle being arranged parallel with the valve-face and passing through a stuffing-box, H, on the shell A, and being provided with a collar, $h$, to keep it in place.

The cam rotates when the spindle G is turned, and opens or closes the valve by the decreasing or increasing radial distance of the cam-faces bearing against pin F, or back of the valve D from the center of revolution of spindle G and cam E.

The valve is constructed with a flat metal face, and the seat is faced with a ring of india-rubber or other suitable soft material, $b'$. The pressure of the steam or water comes toward the rear of the valve, and hence tends to hold the rubber ring against the seat, whereas if the india-rubber were applied to the valve the pressure would have a tendency to tear it off.

What we claim as our invention, and desire to secure by Letters Patent, is—

The valve D, attached to a carriage, B, sliding in a direction perpendicular to the valve-seat on fixed bearings C C, and operated by a spindle, G, and cam E, applied and operating substantially as herein set forth.

WILLIAM SHEDLOCK.
ALFRED SHEDLOCK.
GEORGE MARSHALL.

Witnesses:
JOS. E. PALMER,
EDW. IBBOTSON.